(12) United States Patent
Simanke et al.

(10) Patent No.: US 11,499,039 B2
(45) Date of Patent: Nov. 15, 2022

(54) NUCLEATED POLYOLEFIN COMPOSITIONS AND METHODS AND USES THEREOF

(71) Applicant: Braskem S.A., Camaçari (BR)

(72) Inventors: Adriane Gomes Simanke, São Paulo (BR); Marcia Pires Fortes Ferreira, São Paulo (BR); Mariele Kaipers Stocker, São Paulo (BR); Cristóvão De Lemos, São Paulo (BR)

(73) Assignee: Braskem S.A., Camaçari (BR)

( * ) Notice: Subject to any disclaimer, the term of this patent is extended or adjusted under 35 U.S.C. 154(b) by 562 days.

(21) Appl. No.: 16/315,600

(22) PCT Filed: Jul. 5, 2017

(86) PCT No.: PCT/BR2017/050180
§ 371 (c)(1),
(2) Date: Jan. 4, 2019

(87) PCT Pub. No.: WO2018/006149
PCT Pub. Date: Jan. 11, 2018

(65) Prior Publication Data
US 2019/0225781 A1    Jul. 25, 2019

Related U.S. Application Data

(60) Provisional application No. 62/358,309, filed on Jul. 5, 2016.

(51) Int. Cl.
| *C08L 23/06* | (2006.01) |
| *C08L 23/12* | (2006.01) |
| *C08F 255/02* | (2006.01) |
| *C08K 5/098* | (2006.01) |
| *C08K 5/00* | (2006.01) |
| *B29C 48/00* | (2019.01) |
| *B29K 23/00* | (2006.01) |
| *C08K 3/22* | (2006.01) |
| *C08K 5/14* | (2006.01) |

(52) U.S. Cl.
CPC ........... *C08L 23/06* (2013.01); *B29C 48/022* (2019.02); *C08F 255/02* (2013.01); *C08K 5/0083* (2013.01); *C08K 5/098* (2013.01); *C08L 23/12* (2013.01); *B29K 2023/06* (2013.01); *B29K 2023/12* (2013.01); *C08K 3/22* (2013.01); *C08K 5/14* (2013.01); *C08L 2205/24* (2013.01); *C08L 2207/062* (2013.01)

(58) Field of Classification Search
CPC ........ C08L 23/06; C08L 23/12; C08F 255/02; C08K 5/0083; C08K 5/098
USPC ........................................................... 524/396
See application file for complete search history.

(56) References Cited

U.S. PATENT DOCUMENTS

| 3,595,735 | A | * | 7/1971 | Tyrrell | ................ | B29C 48/10 |
| | | | | | | 428/220 |
| 6,861,481 | B2 | * | 3/2005 | Ding | ................ | B32B 27/20 |
| | | | | | | 525/424 |
| 7,010,201 | B2 | * | 3/2006 | Risch | ................ | C08J 5/046 |
| | | | | | | 385/100 |
| 9,243,127 | B2 | * | 1/2016 | Kawamoto | ............ | C08F 2/44 |

FOREIGN PATENT DOCUMENTS

| CN | 102167783 | A | * | 8/2011 |
| CN | 102167783 | A | | 8/2011 |
| EP | 0 945 479 | A2 | | 9/1999 |
| EP | 2 862 883 | A1 | | 4/2015 |

* cited by examiner

Primary Examiner — Kelechi C Egwim
(74) Attorney, Agent, or Firm — Osha Bergman Watanabe & Burton LLP

(57) ABSTRACT

Methods may include modifying the crystallization properties of a polymer composition including a polyolefin and a nucleating agent with the structure:

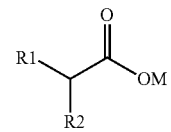

wherein R1 and R2 are independently selected from hydrogen, alkyl, alkenyl, or aryl, wherein the alkyl, alkenyl, or aryl may be substituted with one or more carboxylate groups and M is a metal selected from Group I of the Periodic Table; or wherein R1 and R2 are independently hydrogen, alkyl, alkenyl, or aryl with the proviso that at least one of R1 or R2 is a carbon chain having 1 to 12 carbons with at least one of the carbons in the carbon chain covalently bound to the polyolefin, and wherein the alkyl, alkenyl, or aryl may be substituted with one or more carboxylate groups; and M is a metal selected from Group I of the Periodic Table.

13 Claims, 18 Drawing Sheets

FIG. 6.1
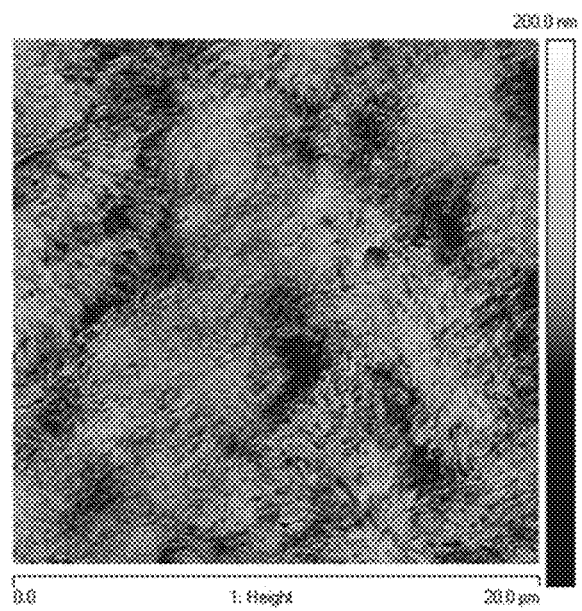
FIG. 6.2
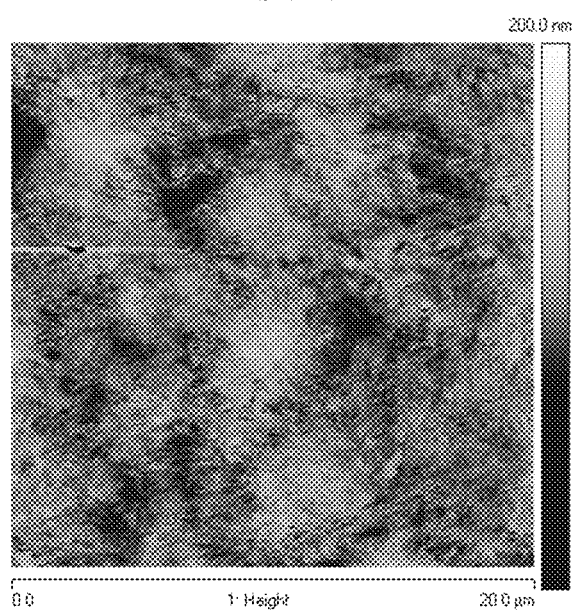

FIG. 6.3
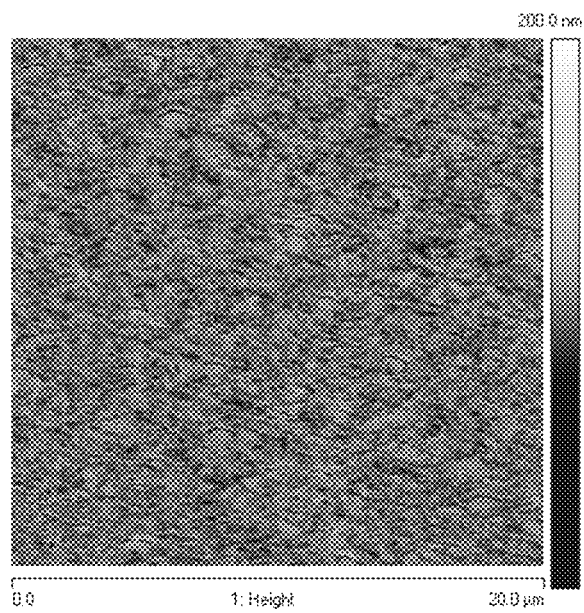
FIG. 7.1
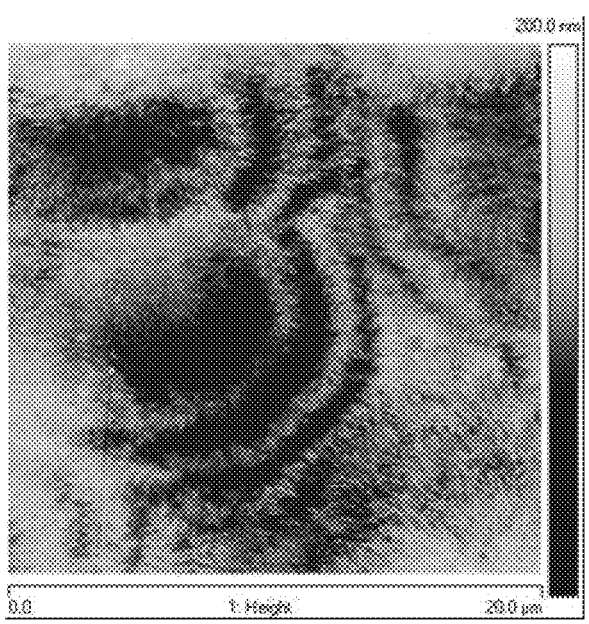

FIG. 7.2
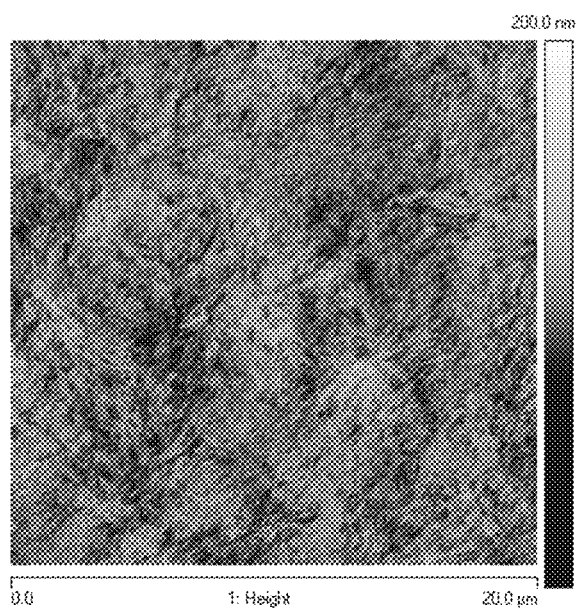
FIG. 7.3
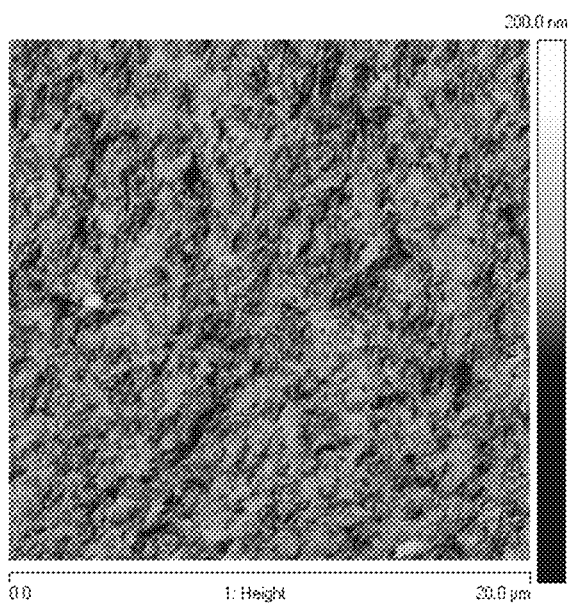

FIG. 10.1
FIG. 10.2
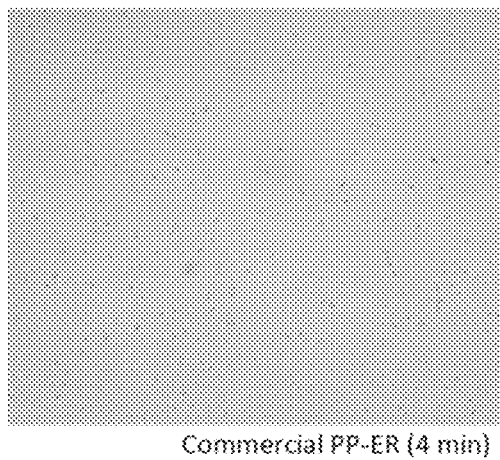
Commercial PP-ER (4 min)
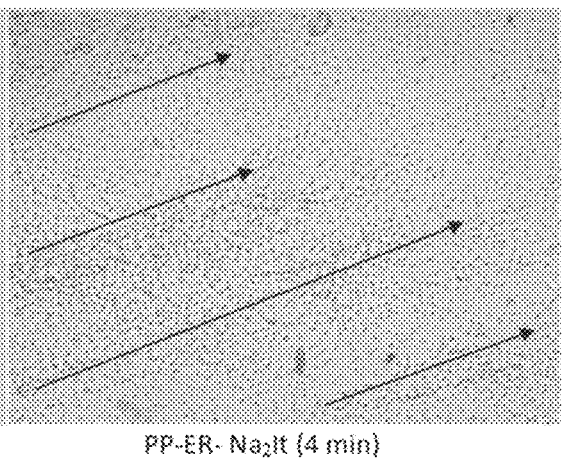
PP-ER- Na$_2$It (4 min)
FIG. 10.3
FIG. 10.4
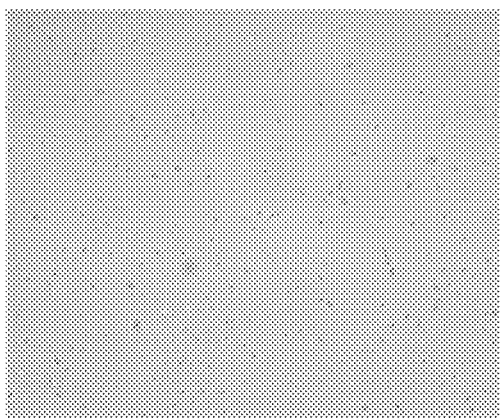
Commercial PP-ER (6 min)
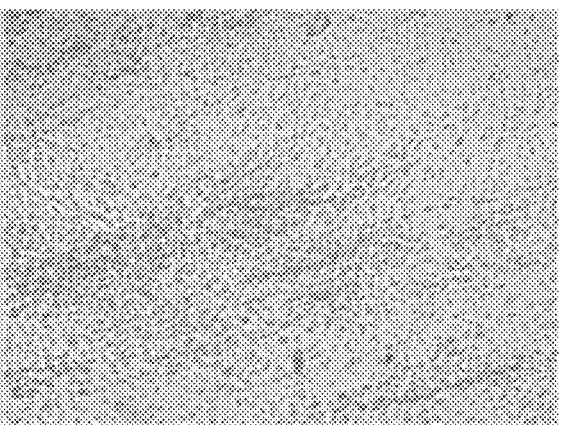
PP-ER- Na$_2$It (6 min)

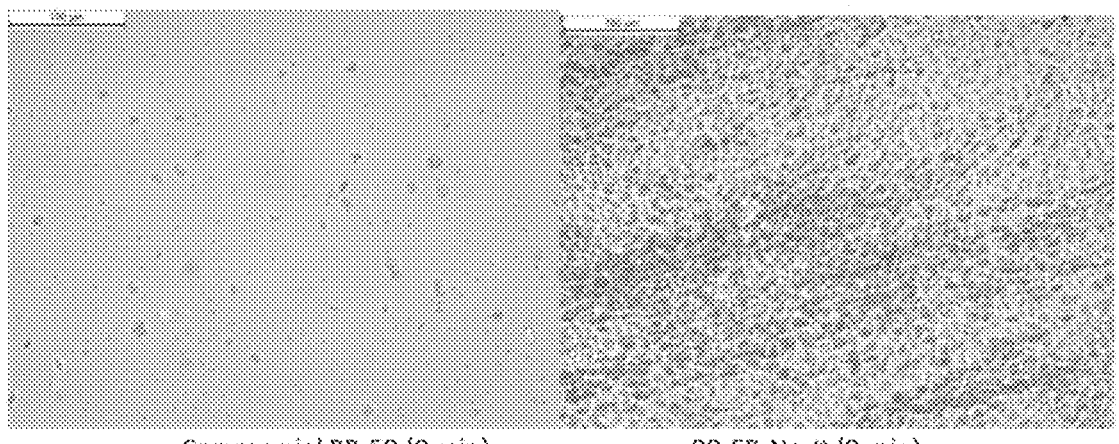
FIG. 10.5 FIG. 10.6

FIG. 12.1
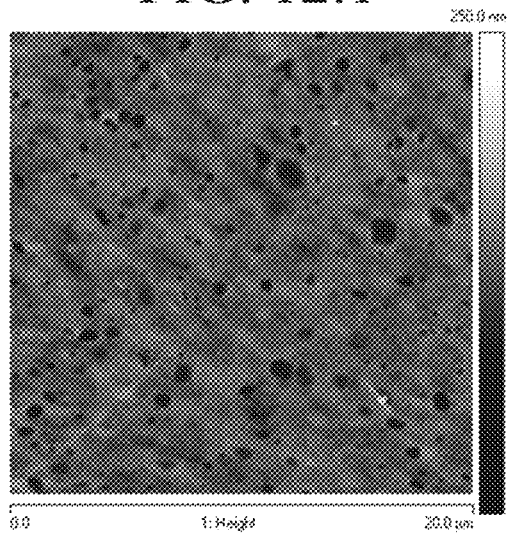
FIG. 12.2
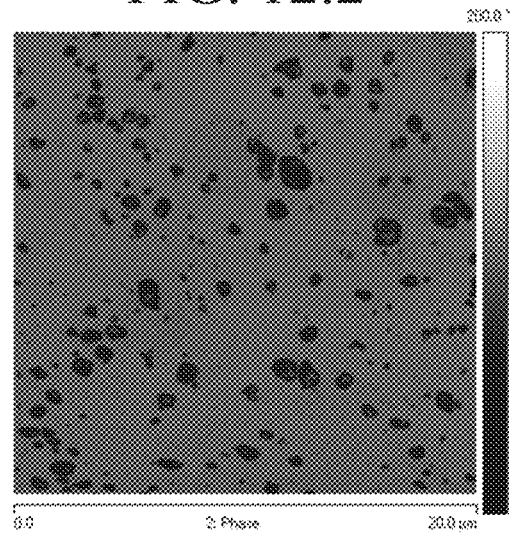
FIG. 12.3
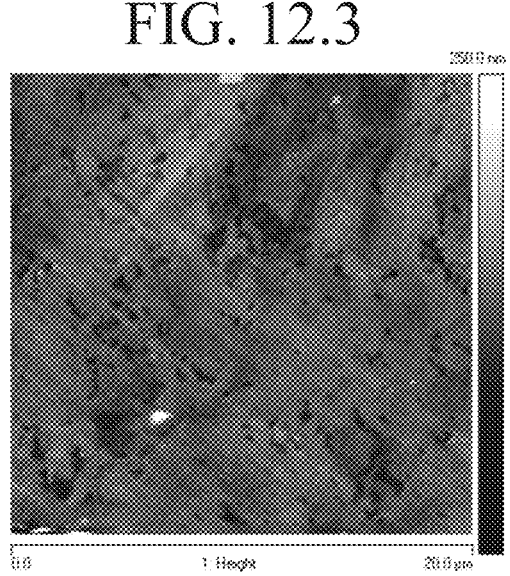
FIG. 12.4
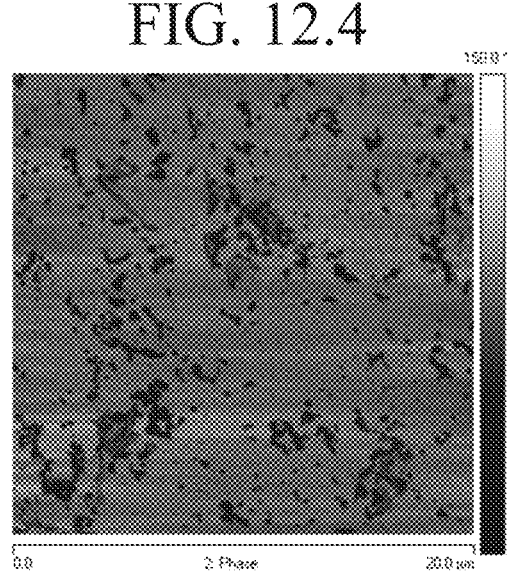
(b)

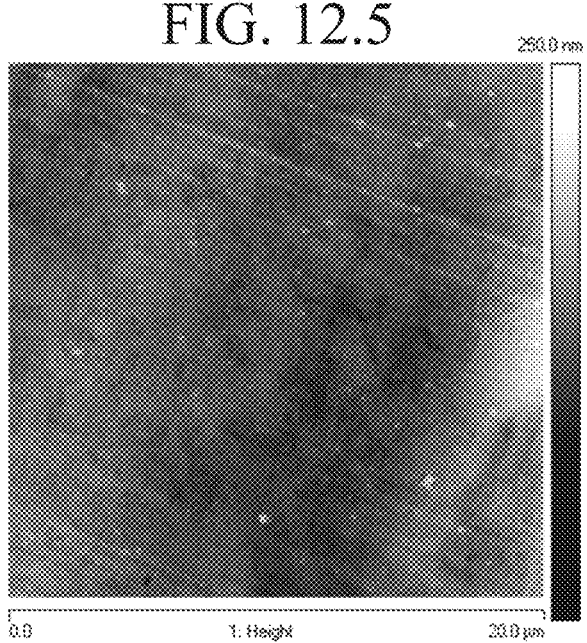 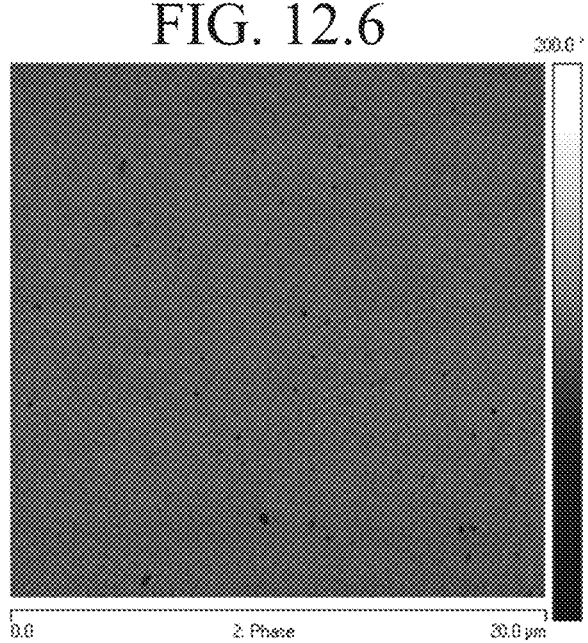
FIG. 12.5　　FIG. 12.6
(c)

FIG. 13.1
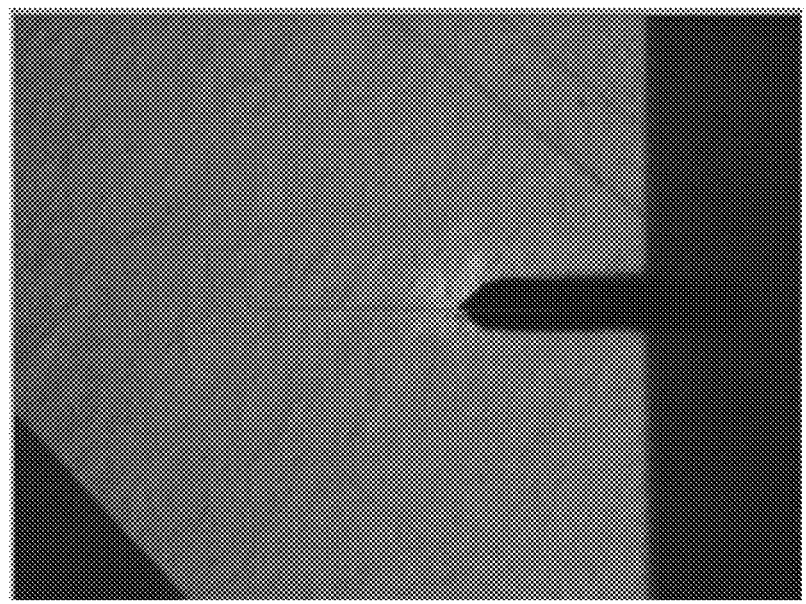
FIG. 13.2
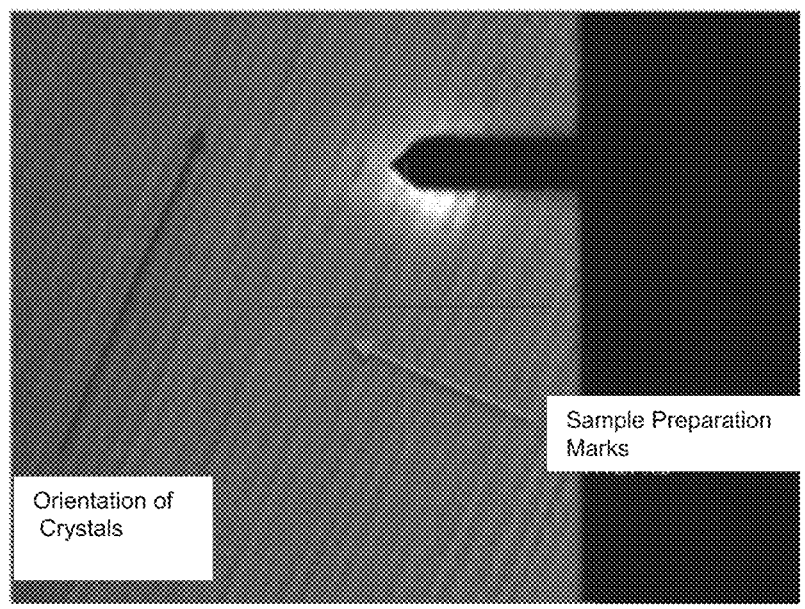

US 11,499,039 B2

NUCLEATED POLYOLEFIN COMPOSITIONS AND METHODS AND USES THEREOF

CROSS-REFERENCE TO RELATED APPLICATIONS

This application claims priority, pursuant to 35 U.S.C. § 119(e), to U.S. Provisional Application No. 62/358,309, filed Jul. 5, 2016, which is incorporated by reference in its entirety.

BACKGROUND

Polyolefins such as polyethylene (PE) and polypropylene (PP) may be used to manufacture a varied range of articles, including films, molded products, foams, and the like. Polyolefins may have characteristics such as high processability, low production cost, flexibility, low density and recycling possibility. However, physical and chemical properties of polyolefin compositions may exhibit varied responses depending on a number of factors such as molecular weight, distribution of molecular weights, content and distribution of comonomer (or comonomers), method of processing, and the like.

In general, polyolefins are widely used plastics worldwide, given their versatility in a wide range of applications. Commercially, polyolefins often require additives, both to prevent their degradation and increase their life time, as well as to obtain better performance in certain applications. Additives that may be dispersed into polymeric materials can be classified into two main groups: those which modify the physical properties of the polymer and those which have a protective effect against aging and degradation of the polymer. Within the first group, there is a category of additives that are the nucleating and/or clarifying agents that act as seeds of the crystallization process, accelerating the rate of crystallization and altering the morphology of crystallizable polymers.

SUMMARY

This summary is provided to introduce a selection of concepts that are described further below in the detailed description. This summary is not intended to identify key or essential features of the claimed subject matter, nor is it intended to be used as an aid in limiting the scope of the claimed subject matter.

In one aspect, embodiments of the present disclosure are directed to methods that include modifying the crystallization properties of a polymer composition comprising a polyolefin and a nucleating agent with the structure:

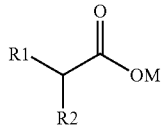

wherein R1 and R2 are independently selected from hydrogen, alkyl, alkenyl, or aryl, wherein the alkyl, alkenyl, or aryl may be substituted with one or more carboxylate groups and M is a metal selected from Group I of the Periodic Table; or wherein R1 and R2 are independently hydrogen, alkyl, alkenyl, or aryl with the proviso that at least one of R1 or R2 is a carbon chain having 1 to 12 carbons with at least one of the carbons in the carbon chain covalently bound to the polyolefin, and wherein the alkyl, alkenyl, or aryl may be substituted with one or more carboxylate groups; and M is a metal selected from Group I of the Periodic Table.

In another aspect, embodiments of the present disclosure are directed to compositions that may include a polyolefin; and a nucleating agent with the structure:

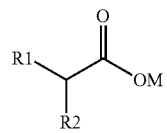

wherein R1 and R2 are independently selected from hydrogen, alkyl, alkenyl, or aryl, wherein the alkyl, alkenyl, or aryl may be substituted with one or more carboxylate groups and M is a metal selected from Group I of the Periodic Table; or wherein R1 and R2 are independently hydrogen, alkyl, alkenyl, or aryl with the proviso that at least one of R1 or R2 is a carbon chain having 1 to 12 carbons with at least one of the carbons in the carbon chain covalently bound to the polyolefin, and wherein the alkyl, alkenyl, or aryl may be substituted with one or more carboxylate groups; and M is a metal selected from Group I of the Periodic Table.

Other aspects and advantages of the disclosure will be apparent from the following description and the appended claims.

BRIEF DESCRIPTION OF FIGURES

FIGS. 6.1-6.3 are atomic force microscopy (AFM) images showing a number of embodiments of the present disclosure.

FIGS. 7.1-7.3 are atomic force microscopy (AFM) images showing a number of embodiments of the present disclosure.

FIGS. 10.1-10.6 are images showing comparative kinetics of isothermal crystallization of a number of embodiments in accordance with the present disclosure.

FIGS. 12.1-12.6 are AFM images of a number of embodiments in accordance with the present disclosure.

FIGS. 13.1-13.2 are magnified images showing the crystalline characteristics of a number of embodiments in accordance with the present disclosure.

DETAILED DESCRIPTION

Figure 1:
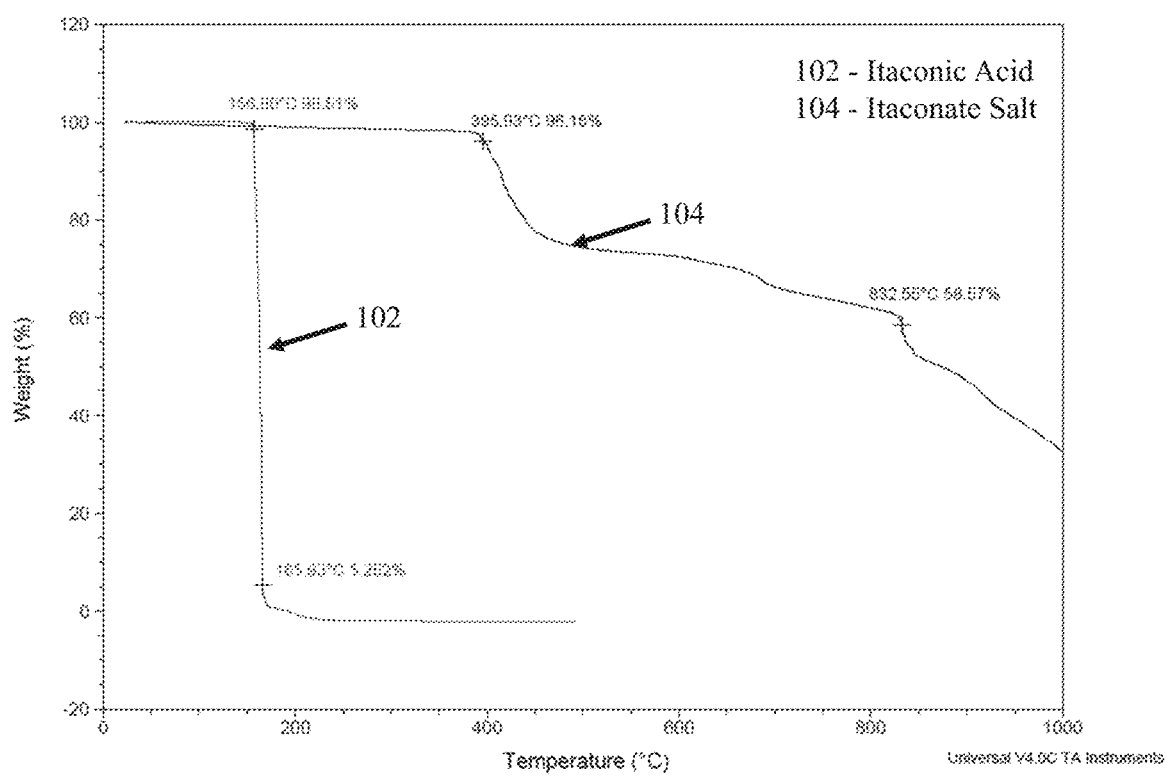
FIG. 1 is a graphic illustration of a thermogram of a number of embodiments in accordance with the present disclosure.

Embodiments of the present disclosure are directed to nucleated polyolefin compositions containing a carboxylate salt nucleating agent. In one or more embodiments, carboxylate salt nucleating agents may be dispersed throughout a polyolefin composition or chemically grafted onto the backbone of a polyolefin chain. Nucleated polyolefin compositions in accordance with the present disclosure may exhibit improvements in mechanical, thermal, and optical properties over comparative untreated polyolefin compositions.

In industrial application, crystalline polymers, such as polypropylene, may exhibit high tensile strength and substantial hardness, but also low clarity that as opacity leads to opaqueness for solid articles and hazes in thin films. Highly crystalline polymers may also translate to a material having low impact resistance particularly at low temperatures. To reduce the negative properties of crystalline polymers, additives such as nucleating agents are employed in the industry to decrease opacity and to improve mechanical strength. Nucleating agents in particular modify the crystallization process and alter the size of spherulites formed upon crystallization. In addition, nucleating agents may decrease the crystallization times and decrease warpage during molding processes. However, polymers modified with nucleating agents may exhibit higher shrinkage than articles without nucleating agent.

A common defect in polymer processing techniques such as injection molding is deformation of the molded part as a result of different stresses caused by polymer orientation. Longer mold residence time is needed to stiffen the material to such an extent that it can withstand these stresses and inhibit the deformation. Cycle time can thus also be reduced by optimizing the shrinkage properties of polyolefins by adjusting the orientation of the polymer crystals by a nucleating agent. Nucleating agents that adjust the shrinkage to be more isotropic, i.e., shrinkage in the machine direction becoming equal to shrinkage in the transverse direction are favorable for reducing cycle time where deformation is the limiting factor in the molding process. Cycle time is very important in the economic viability and profitability of molded part manufacture.

Polyolefin compositions in accordance with the present disclosure may exhibit enhanced nucleation properties that enable to achieve a significant cycle time reduction in various molding processes compared to using non-nucleated polyolefins. In some embodiments, cycle time reduction may be achieved during production processes by inducing a higher crystallization temperatures (Tc) and/or low crystallization half time ($t_{1/2}$) in a given resin composition, which signals that a molten resin will begin to harden at higher production temperatures. This decreases the necessary cooling time and facilitates ejection of the articles from the mold at a faster rate than would be possible without the use of a nucleating agent.

Carboxylate salt nucleating agents in accordance with the present disclosure may be combined with a polyolefin such as polypropylene or polyethylene to improve optical properties and reduce opacity of films and thicker polymer articles, in addition to improving mechanical properties, thermal stability, and decreasing the cycle time of certain processes, such as injection. Nucleated polyolefins in accordance with the present disclosure may be used in a number of diverse market segments, such as automotive, films, household appliances and medical devices.

In one or more embodiments, carboxylate salt nucleating agents may be combined with a polyolefin through a number of routes. In some embodiments, the carboxylate salt nucleating agent may be introduced as a salt that is dispersed in a polyolefin matrix during melt processing, such as by an extrusion process, alone or in combination with other polymer additives. In some embodiments, the carboxylate salt nucleating agent may be grafted onto the polyolefin by combining the polyolefin with a carboxylate salt nucleating agent precursor, such as the free acid, and a peroxide source during an extrusion process to graft the respective carboxylic acid group onto the polyolefin, followed by neutralization of the appended acid with a metal hydroxide by combination in an extruder or in solution.

In one or more embodiments, carboxylate salt nucleating agents may be added alone or together with other additives. In some embodiments, carboxylate salt nucleating agents may be added to a polyolefin as a solid that is then melt processed, or an carboxylate salt nucleating agent may be added to a polyolefin at any point during melt processing, such as during an extrusion process. For example, a nucleating agent may be combined with a polyolefin as a single stage or through addition to the feed zone of a single- or twin-screw extruder, under the application of heat under melt conditions. In some embodiments, the carboxylate salt nucleating agent may be combined with a polyolefin by feeding each of the components into a screw extruder, where the concentration may be controlled by modifying the feed rate of each of the respective components. The resulting modified polyolefin composition may be formed into pellets, and stored for a time, or alternately employed immediately in a forming process.

Polyolefins modified with nucleating agents in accordance with the present disclosure may then be employed in all types of forming processing including injection molding, extrusion blow molding, injection stretch blow molding, thermoforming, and the like. Polyolefin compositions in accordance with the present disclosure may be used in standard thermoplastic processing methods to generate polymer articles such as monolayer film, multilayer film, packaging including food packaging, storage containers, medical devices, plastic tubes and pipes, shelving units, caps, injection molded articles, extruded articles, co-extruded articles, thermoformed articles, foams, blow-molded articles, rotomolded articles, pultruded articles, and the like.

Polyolefins

Polyolefin compositions in accordance with the present disclosure may include polymers generated from olefin monomers, and may also include copolymers and higher order polymers containing one or more additional comonomers. Examples of polyolefins include polyethyeelenes such as polyethylene homopolymers, polyethylene copolymers containing one or more olefin comonomers, high density polyethylene, medium density polyethylene, low density polyethylene, linear low density polyethylene, very low density polyethylene, ultra low density polyethylene, ultra-high molecular weight polyethylene and polypropylenes such as polypropylene homopolymer, polypropylene copolymers containing one or more olefin comonomers, heterophasic polypropylene, random polypropylene. Olefin comonomers used to produce polyolefin compositions in accordance with the present disclosure may include branched and linear C2-C8 alkene monomers including ethylene, propylene, butylene, and the like. Polypropylenes in accordance with the present disclosure may be atactic or may have a stereoregularity that is isotactic or syndiotactic.

In one or more embodiments, the polyolefin compositions may include a copolymer prepared from a combination of monomers, and may be random or block copolymers. In addition to the olefin monomers described above, additional comonomers may also include unsaturated esters such as vinyl acetate. For example, in one or more embodiments an ethylene-vinyl acetate copolymer may be combined with the carboxylate salt nucleating agent of the present disclosure. In one or more embodiments, the polyolefin compositions may include polymers generated from petroleum based monomers and/or biobased monomers. Commercial examples of biobased polyolefins are the "I'm Green"™ line of bio-polyethylenes from Braskem S.A.

Polyolefin compositions may include polypropylene copolymers having propylene contents higher than 50% by weight in some embodiments, and polyethylene copolymers with ethylene contents higher than 50% by weight in some embodiments. In a particular embodiment, polyolefin copolymers in accordance with the present disclosure may include a copolymer of ethylene and vinyl acetate, in which the copolymer contains a final vinyl acetate content of 5 to 30 wt % by weight.

Polyolefin compositions in accordance with the present disclosure include polymers and copolymers having a number average molecular weight of from about 10 kDa to about 2,000 kDa in some embodiments, and 30 kDa to about 400 kDa.

Polyolefin compositions in accordance with the present disclosure may also include a number of a polymer additives including stabilizers such as distearyl pentaerythritol phosphite; metal compounds such as zinc 2-ethylhexanoate; epoxy compounds such as epoxidized soybean oil and epoxidized linseed oil; nitrogen compounds such as melamine; phosphorus compounds such as tris(nonylphenyl) phosphite; UV absorbers such as benzophenone compounds and benzotriazole compounds; antioxidants; silicone oils; fillers such as clay, kaolin, talc, hydrotalcite, mica, zeolite, perlite, diatomaceous earth, calcium carbonate, glass (beads or fibers), and wood flour; foaming agents; foaming aids; crosslinking agents; crosslinking accelerators; flame retardants; dispersants; and processing aids such as resin additives. Other additives may include plasticizers, acid scavengers, antimicrobials, antioxidants, flame retardants, light stabilizers, antistatic agents, colorants, pigments, perfumes, chlorine scavengers, and the like.

In one or more embodiments, polyolefin compositions may exhibit elevated peak crystallization temperatures (Tc) relative to unmodified polyolefins, such as by at least 1° C., 2° C., or 3° C. The Tc for a polymer is one measure of the extent of nucleation of the resin during heating or cooling. In one or more embodiments, polyolefin compositions (particularly polyethylenes) may exhibit a reduced crystallization half-life $t_{1/2}$ relative to unmodified polyolefins, such as by at least 25%, 30%, 40% or 50%. In some embodiments, the peak crystallization temperature may be substantially the same, but the $t_{1/2}$ may be reduced. For example, the higher the Tc value, the stronger the degree of nucleation. Polyolefin compositions may also exhibit improvements in morphology over an unmodified polymer composition such as a reduction in the overall size of formed spherulites and other structures associated with decreases in that decrease opacity and material strength. For example, in one or more embodiments, polyolefin compositions (particularly polypropylenes or propylene copolymers) may exhibit reduced opacity by at least 40 or 50%. For example, in one or more embodiments, polyolefin compositions may exhibit an impact resistance that is at least equal to the unmodified polyolefin, and may even have an improvement by at least 15%, 25%, 35%, or 50%.

Polyolefin compositions in accordance with the present disclosure may exhibit a melt flow index (MFI) of from 0.5 to 250 g/10 min.

Nucleating Agents

Polyolefin compositions in accordance with the present disclosure may include one or more carboxylate salt nucleating agents, particularly dicarboxylate salt nucleating agents. In one or more embodiments, carboxylate salt nucleating agents may be dispersed within a polymer matrix using various melt processing techniques. In some embodiments, carboxylate salt nucleating agents may be chemically bound to the polyolefin backbone by reacting the polyolefin with a carboxylate salt nucleating agent precursor, such as the free acid form of the respective carboxylate. For example, a polyolefin may be combined with a carboxylate salt precursor and a peroxide source, followed by initiation of a free radical reaction, which results in the formation of a covalent bond between the precursor and the polyolefin backbone. The mixture is then subsequently reacted with a neutralizing agent to convert the precursor to the salt form to generate the active nucleating agent.

In one or more embodiments, polyolefin compositions may be modified with a carboxylate salt nucleating agent having the structure:

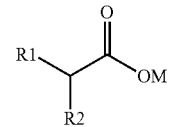

wherein R1 and R2 are independently selected from hydrogen, alkyl, alkenyl, or aryl, wherein the alkyl, alkenyl, or aryl may be substituted with one or more carboxylate groups, and M is a metal selected from Group I of the Periodic Table. In embodiments directed to polyolefin compositions that have been grafted with a carboxylate salt nucleating agent, R1 and R2 are independently hydrogen, alkyl, alkenyl, or aryl with the proviso that at least one of R1 or R2 is a carbon chain having 1 to 12 carbons with at least one of the carbons in the carbon chain covalently bound to the polyolefin, and wherein the alkyl, alkenyl, or aryl may be substituted with one or more carboxylate groups. Thus, in one or more embodiments, the carboxylate salt may contain at least one double bond (particularly in the embodiments that graft the nucleating agent onto the polymer) and also be a dicarboxylate.

In one or more embodiments, nucleating agents in accordance with the present disclosure include salts derived from one or more linear and branched, saturated and unsaturated, diacids having from 3 to 14 carbon atoms such as succinic acid, glutaric acid, malonic acid, adipic acid, suberic acid, azelaic acid, sebacic acid, dodecanedioic acid, itaconic acid, and the like. Other nucleating agents may include acrylate salts, vinyl benzoic salts, maleic salts, sorbic salts, fumaric salts, and unsaturated carboxylic salts. For example, nucleating agents may include methacrylic acid, 4-vinylbenzoic acid, crotonic acid, maleic acid, sorbic acid, trans-cinnamic acid, trans-2,3-dimethylacrylic acid, 2-(trifluoromethyl) acrylic acid, 2-phenylacrylic acid, 3-(3-nitrophenyl)acrylic acid, 3-[3-(trifluoromethyl)phenyl]acrylic acid, 3-[4-(trifluoromethoxy)phenyl]acrylic acid, trans-3-chloroacrylic acid, cis,cis-muconic acid, fumaric acid monoethyl ester, 3-ethoxyacrylic acid, and the like.

Nucleating agents in accordance with the present disclosure include carboxylate salts produced from the neutralization of an organic acid with a metal hydroxide or other suitable metal salt. For example, carboxylate salt nucleating agents may be a carboxylate salt generated from a neutralization reaction of a corresponding free diacid with a metal hydroxide containing an ionized metal selected from Groups I of the periodic table.

Carboxylate salt nucleating agents used in accordance with methods of the present disclosure may be obtained in salt form by mixing the free acid form of the carboxylate salt nucleating agent and a metal hydroxide in an alcoholic solution (such as ethanol or propanol) for a few minutes, allowing precipitation, filtering, and drying the obtained salt in some embodiments, or neutralizing the acid form during extrusion in other embodiments.

In one or more embodiments, carboxylate salt nucleating agents may be characterized by FTIR in a KBr pellet, using proton nuclear magnetic resonance (1H NMR), and/or evaluating thermal stability by thermogravimetric analysis (TGA). Carboxylate salt nucleating agents may possess excellent thermal properties, making it possible to use them under normal processing conditions for polyolefins as verified by TGA. With particular respect to FIG. 1, a TGA thermogram of itaconic acid 102 and sodium itaconate salt 104 is shown, where the thermogram was determined according to ASTM E1131.

Nucleating agents in accordance with the present disclosure may be dispersed into a polyolefin composition at a concentration that ranges from 500 to 7,000 ppm in some embodiments, and from 2,000 to 4,000 ppm in some embodiments.

In embodiments in which the carboxylate salt nucleating agents are grafted onto the polyolefin backbone, the amount of nucleating agent added to the grafting reaction mixture may be a percent by weight (wt %) of nucleating agent that ranges from 0.10 to 3.0 wt %. In some embodiments, the reacted polyolefin composition may contain from 0.25 to 2.0 wt % of grafted nucleating agent. However, it is envisioned that the concentration of grafted monomer may be more or less depending on reaction efficiency and other factors such as melt temperature, the molecular weight of the polyolefin and the nucleating agent, peroxide agent concentration, and the like. Quantification of the amount of carboxylate salt nucleating agent grafted in a polyolefin composition may be determined using any available technique, including Fourier transform infrared (FTIR) spectroscopy.

The efficiency of a nucleating agent may depend on its size, shape, morphology, chemical nature and its behavior when incorporated into a polymer composition. For example, nucleating agents may exhibit differing efficiencies in polyethylene compositions when compared to polypropylenes The difference in performance may be associated with the fast crystallization rate of polyethylene, which limits the efficiency of nucleating agents at low concentrations or motilities through the polyolefin matrix.

In one or more embodiments, carboxylate salt nucleating agents may impart beneficial properties to polyolefin compositions alone or when used in conjunction with other types of organic and/or inorganic nucleating agents. Inorganic nucleating agents may include talc, silica, kaolin, carbon black, clay, among others. Other organic nucleating agents may include sodium benzoate, sorbitol derivatives and organophosphates that may be used to improve the transparency of polypropylenes. The effect of inorganic nucleating agents may be poor when compared to the effect of organic agents, and in addition, the presence of these mineral fillers in the polymer can strongly affect mechanical properties such as modulus and impact.

Peroxide Source

Peroxide sources in accordance with embodiments disclosed herein include chemical reagents that dissociate via hemolytic cleavage of peroxides to produce free radical species such as hydroxyl radicals, alkoxy, or alkyl free radicals. In one or more embodiments, peroxide sources may be selected from hydrogen peroxide, calcium peroxide, magnesium peroxide, alkali metal peroxides, dialkyl peroxides, peroxy acids such as peroxybenzoic acid and ring-substituted peroxybenzoic acids such as peroxy-naphthoic acid; aliphatic, substituted aliphatic, and arylalkyl monoperoxyacids such as peroxylauric acid, peroxystearic acid and N,N-phthaloylaminoperoxy caproic acid (PAP), and 6-octylamino-6-oxo-peroxyhexanoic acid. In some embodiments, peroxide sources may include diperoxyacids such as benzoyl peroxide, diperoxydodecanedioic acid (DPDA), 1,9-diperoxyazelaic acid, diperoxybrassilic acid, diperoxysebasic acid and diperoxyisophthalic acid, 2-decyldiperoxy butane-1,4-diotic acid, and 4,4'-sulphonylbisperoxybenzoic acid.

Peroxide sources may also be selected from delayed peroxide sources that release peroxide-forming species over a period of time or upon exposure to an appropriate stimulus such as contact with solvent, exposure to proper pH, or temperature. Delayed peroxide sources may include solid peroxide sources, perborates such as sodium perborate, persilicate salts, percarbamides, persulfate compounds such as potassium persulfate, sodium persulfate, ammonium persulfate, and the like. Other suitable radical initiators may include salts or derivatives of percarbonic acid (such as isopropyl percarbonate) and salts or derivatives of perphosphonic acid.

Peroxide sources in accordance with the present disclosure may be added to a polyolefin composition at a percent by weight (wt %) of polyolefin that ranges from 0.1 to 2 wt % in some embodiments, and from 0.25 to 1 wt % in other embodiments.

Neutralizing Agent

Methods of preparing grafted polyolefins in accordance with the present disclosure may also include the steps of neutralizing the grafted polymer with a neutralizing agent subsequent to reaction of the polyolefin with the acid form of the corresponding carboxylate salt nucleating agent. While the salt form of nucleating agents in accordance with the present disclosure appears to exhibit the best improvement in polymer nucleation and crystallization, the grafting reaction proceeds most efficiently when the polymer and nucleating agent are combined in melt or solution phase. Carboxylate salt nucleating agents demonstrate elevated melting temperatures that are often above the usual polymer extrusion temperatures of 190° C.-250° C. (or above the decomposition temperatures for many organic salts), which limits the mixing and grafting efficiency of the polyolefin composition. To enhance dispersion of the nucleating agent within the polyolefin, the acid form may be used to perform the grafting reaction, which may then be followed by neutralization by melting or solubilizing the polymer in the presence of a suitable neutralizing agent. Such processes may occur at temperatures lower than 300° C., or even no more than 250° C.

Neutralizing agents in accordance with the present disclosure include bases and weak acids capable of deprotonating acid form of the corresponding carboxylate salt nucleating agents in grafted polyolefins. Examples of neutralizing agents include alkali metal salts such as sodium hydroxide, potassium hydroxide, lithium hydroxide, cesium hydroxide, silicates such as sodium silicate, potassium silicate, weak salt acids such as sodium carbonate, sodium sulfite, sodium phosphate, potassium carbonate, potassium sulfite, sodium sulfate, and potassium sulfate.

Neutralizing agents in accordance with the present disclosure may be added to a polyolefin composition at a percent by weight (wt %) of polyolefin that ranges from 0.1 to 3 wt % in some embodiments, and from 0.25 to 2 wt % in other embodiments. However, it is envisioned that more or less neutralizing agent may be used depending on the concentration of the acid form of the corresponding carboxylate salt nucleating agent added to the polyolefin composition. For example, the neutralizing agent may be added at a 1:1 ratio of acid form of the corresponding carboxylate salt nucleating agent added in the polyolefin composition, when the carboxylate salt nucleating agent is grafted onto the polymer.

Pigments

Polyolefin compositions in accordance with the present disclosure may be formulated to contain one or more pigments in order to produce resins and articles having superior clarity and optical properties. Pigments are commonly used in thermoplastics and are useful in the practice of the present disclosure. Pigments may be generally classified as organic or inorganic. In the practice of the invention, a water insoluble coloring agent having of at least one pigment may be employed. Pigments in accordance with the present disclosure may be any user defined color, including black, purple, or blue. Pigments may be used singly or combined with other coloring agents or optical brighteners.

Polyolefin compositions may be formulated to contain a carboxylate salt nucleating agent and a pigment at a ratio that ranges from 20,000:1 to 500:1 of carboxylate salt nucleating agent pigment in some embodiments; and from 10,000:1 to 1,000:1 of carboxylate salt nucleating agent pigment in other embodiments.

EXAMPLES

The following examples describe results of characterization of chemical structure, optical properties, thermal properties, mechanical properties and morphology. Example 1 describes polyolefin compositions modified with carboxylate salt nucleating agents in accordance with the present disclosure by premixing the polyolefin composition and the nucleating agent, followed by extrusion. Examples 2 and 3 discuss embodiments of the present disclosure in which a polyolefin composition and nucleating agent are first reacted in the presence of a peroxide source, followed by extrusion and addition of the neutralizing agent.

Example 1—Dispersed Carboxylate Salt Nucleating Agent

In a first example, polyolefin compositions in accordance with the present disclosure were prepared using a carboxylate salt nucleating agent. Two types of high density polyethylene resin (HDPE) were used: HDPE1 having a melt-flow index (MFI) (190° C./2.16 kg) of 20 g/10 min; and HDPE2 having a MFI (190° C./2.16 kg) of 22 g/10 min. Assayed nucleating agents included commercially available Hyperform® HPN-20E from Milliken as a comparative example and carboxylate salt nucleating agent $Na_2It$.

The concentration of the nucleating agent in the formulations was 1000 ppm and 5000 ppm. The extrusion conditions used to combine the nucleating agent were similar to those usually used for polyolefins. In a second step, the extruded samples were injected according to ASTM D 3641 (1 mm thick plate) for optical properties tests (60° brightness and opacity according to ASTM D2457 and D1003) and atomic force microscopy (AFM), performed on the inside of the plates.

The results of optical property testing for the samples are shown in Table 1, where brightness was determined according to ASTM D2457, and opacity was determined according to ASTM D1003.

TABLE 1

Results of optical properties of the HDPE1 and HDPE2 samples with Na2It and commercial nucleant for PE.

| Resin | Nucleant | Contents (ppm) | Brightness (%) | Opacity (%) |
|---|---|---|---|---|
| HDPE 1 | 0 | 0 | 54 | 100 |
|  | HPN-20E | 1000 | 54 | 95.8 |
|  |  | 5000 | 55 | 94.1 |
|  | Na2It | 1000 | 60 | 96.4 |
|  |  | 5000 | 55 | 96.2 |
| HDPE 2 | 0 | 0 | 20 | 100 |
|  | HPN-20E | 1000 | 22 | 99.2 |
|  |  | 5000 | 21 | 92.7 |
|  | Na2It | 1000 | 28 | 93.2 |
|  |  | 5000 | 25 | 90.4 |

The results show that the Na2It exhibits similar performance to the commercial nucleant in terms of brightness, opacity and clarity. It is noted that the gain of optical properties is more evident in the HDPE2, pointing out the possible influence of the polymerization technology on these properties.

Figure 2:
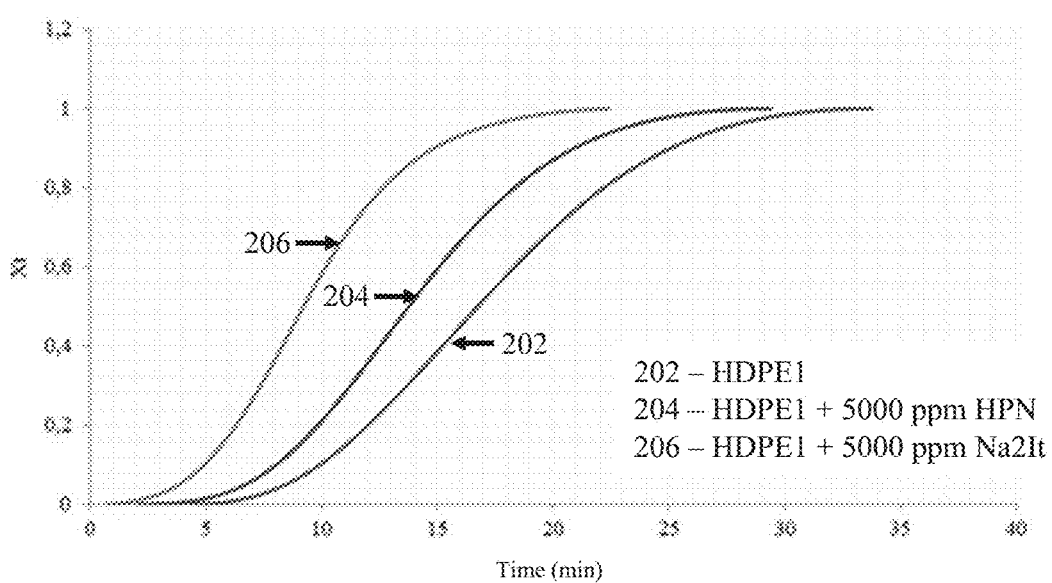
FIGS. 2 and 3 are graphic illustration showing the kinetics of isothermal crystallization of a number of embodiments in accordance with the present disclosure.
Figure 3:
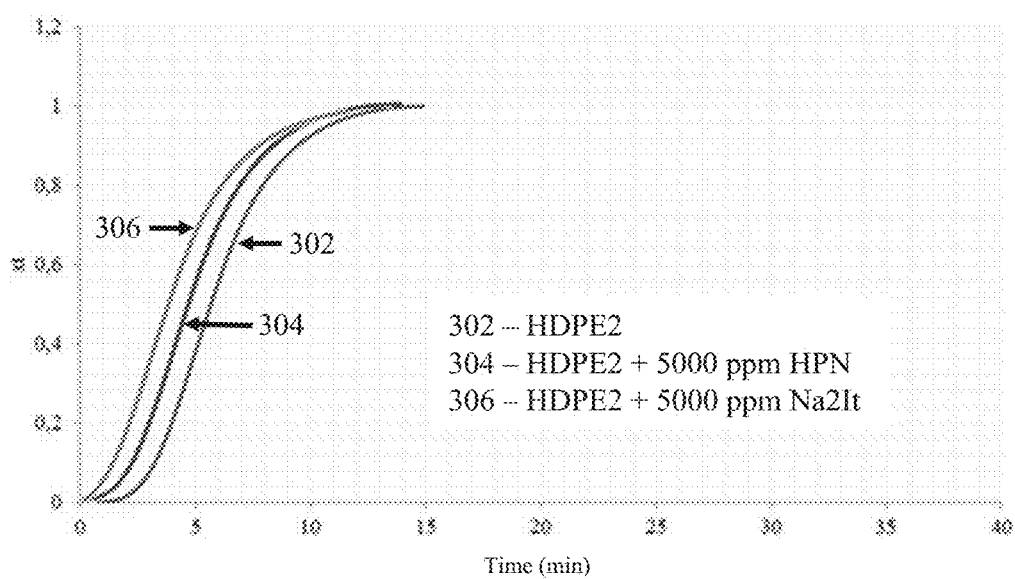

On the other hand, when analyzing the crystallization kinetics of the nucleated polyethylenes, samples nucleated with Na2It present a higher crystallization rate than those with the commercial nucleant. With particular respect to FIG. 2, the kinetics of isothermal crystallization (124° C.) is shown for a comparative sample of HDPE1 202 and formulations containing HPN-20E 204 and $Na_2It$ 206, where testing was performed according to ISO 11357-7 2002. With particular respect to FIG. 3, the results for the kinetics of isothermal crystallization (124° C.) are shown for samples of HDPE2 302 and samples containing the nucleant additives containing HPN-20E 304 and $Na_2It$ 306 are shown.

Sample data is also presented in Table 2, where Avrami parameters were determined according to ASTM E698 and ASTM D3418-0

TABLE 2

Avrami Parameters, Tc and $t_{1/2}$ of pure HDPE1 and HDPE2 and with 5000 ppm of nucleating agent

| Polymer | Tc (° C.) | $t_{1/2}$ (min) | n | K (min$^{-1}$) |
|---|---|---|---|---|
| HDPE1 | 117 | 16.8 | 2.3 | 0.13 |
| HDPE1 + 5000 ppm Na2It | 118 | 9.2 | 2.2 | 1.07 |
| HDPE1 + 5000 ppm HPN-20E | 118 | 13.8 | 2.2 | 0.61 |
| HDPE2 | 118 | 5.7 | — | — |
| HDPE2 + 5000 ppm Na2It | 119 | 3.9 | — | — |
| HDPE2 + 5000 ppm HPN-20E | 119 | 4.8 | — | — |

The values of n reflect qualitative information about the nature of nucleation and crystal growth process, where there is no apparent difference between the nucleants assayed in relation to this parameter. An increase in the value of the parameter K by the addition of the nucleating agent was noted for the samples, with larger values for the polymer containing $Na_2It$. The lower the value of the crystallization half-life ($t_{1/2}$), the higher the value of K, confirming the capacity of increase of the nucleation rate for both nucleants, but being larger for those containing Na₂It. With the use of Na₂It, a gain of at least 30% in $t_{1/2}$ under the tested conditions was obtained with respect to the polyethylene homopolymer, while with HPN-20E the maximum reduction obtained was 18%.

Figure 4:
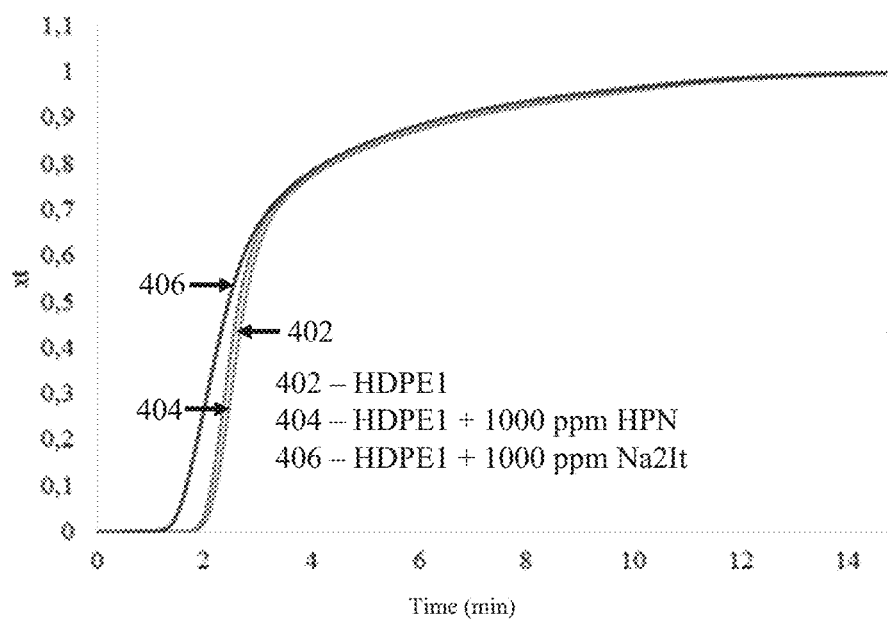
FIGS. 4 and 5 are graphic illustration showing the kinetics of non-isothermal crystallization of a number of embodiments in accordance with the present disclosure.
Figure 5:
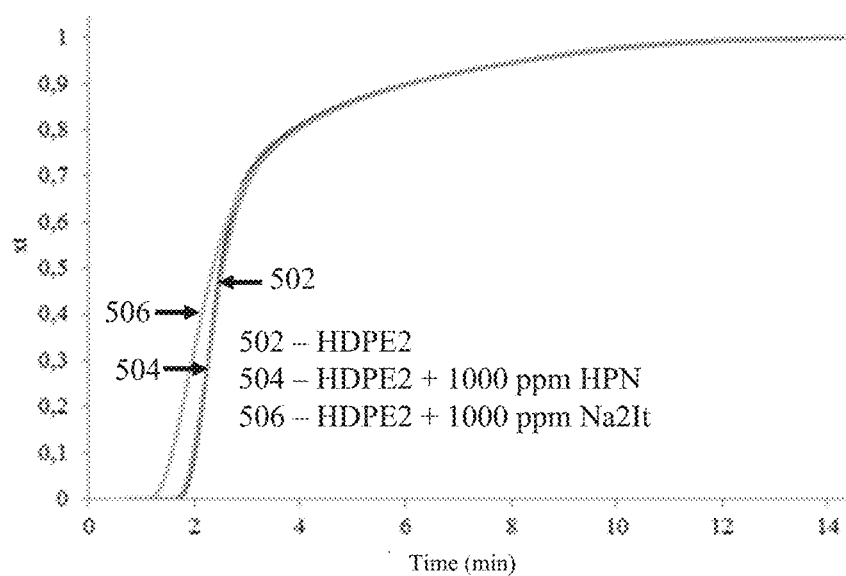

It is noted that when lower levels of nucleants are used, e.g., 1000 ppm, Na₂It exhibits superior performance, while HPN-20E has no effect on polyethylene at these levels, as shown in FIGS. 4 and 5. With particular respect to FIG. 4, non-isothermal crystallization kinetics (5° C./min) is shown for pure HDPE1 402 and with nucleating agents HPN-20E 404 and Na2It 406. With respect to FIG. 5, non-isothermal crystallization kinetics (5° C./min) is shown for pure HDPE2 502 and with nucleating agents HPN-20E 504 and Na2It 506. Crystallization kinetics were performed according to ISO 11357-7 2002.

The improvement in the optical properties and in the crystallization kinetics of the two HDPE resins can be explained by a modification in the crystalline structure of the polyethylene, as can be observed in the Atomic Force Microscopy (AFM) images shown in FIGS. 6.1-6.3 and 7.1-7.3. In the AFM images, crystalline lamellae, organized regions that accumulate to form larger spherulites, commonly observed for polyethylene, are visible and have a mean thickness between 20-30 nm.

With particular respect to FIGS. 6.1-6.3, AFM images are presented showing crystallization properties HDPE1 alone (FIG. 6.1) and modified with 5000 ppm of HPN-20E (FIG. 6.2) and Na2It (FIG. 6.3). Modification of the HDPE1 morphology is best seen in the presence of Na2It. For this polymer, it is observed that the crystalline lamellae of PE are homogeneously dispersed, whereas the commercial nucleant does not appear to change the morphology. The opacity property is less affected by the presence of the nucleant, as observed in Table 1, possibly due to the presence of the comonomer deriving from the polymerization technology.

With particular respect to FIGS. 7.1-7.3, AFM images are presented showing crystallization properties HDPE 2 alone (FIG. 7.1) and modified with 5000 ppm of HPN-20E (FIG. 7.2) and Na2It (FIG. 7.3). In the micrograph of pure HDPE2 (FIG. 7.1), three relatively homogeneous spherulites with a diameter of approximately 11 μm are clearly verified.

Addition of the HPN-20E (FIG. 7.2) or Na2It (FIG. 7.3) considerably modifies the morphology of HDPE2, altering the crystal morphology. Possibly the presence of the nucleant reduces the size of the spherulite, or promotes the formation of a new crystalline organization. This behavior may explain the results of opacity (Table 1), so that this new morphology corroborates for the increase of the passage of light (reduction of opacity). For the sample with commercial nucleant HPN-20E the presence of some spherulites is still observed, where the opacity was slightly reduced (Table 1).

In general, the addition of nucleants may make a material stiffer, reducing impact resistance. Table 3 shows that the impact resistance was not significantly altered by the addition of the nucleants, and in some cases, it was observed until an improvement of the same. For the samples shown in Table 3, Izod impact 23° C. (J/m) was determined according to ASTM D256 and D618.

TABLE 3

Izod impact of the pure HDPEs and with the different nucleants.

| Polyolefin | Nucleating Agent | Contents of nucleating agent (ppm) | Izod 23° C. (J/m) |
| --- | --- | --- | --- |
| HDPE1 | HPN-20E | 0 | 25 ± 1 |
|  |  | 1000 | 26 ± 1 |
|  |  | 5000 | 26 ± 1 |
| HDPE1 | Na2It | 0 | 25 ± 1 |
|  |  | 1000 | 24 ± 1 |
|  |  | 5000 | 23 ± 1 |
| HDPE2 | HPN-20E | 0 | 310 ± 5 |
|  |  | 1000 | 310 ± 10 |
|  |  | 5000 | 340 ± 7 |
| HDPE2 | Na2It | 0 | 310 ± 5 |
|  |  | 1000 | 390 ± 7 |
|  |  | 5000 | 461 ± 10 |

Example 2—Grafted Carboxylate Salt Nucleating Agent

High density polyethylene, MFI of 20 g/10 min (190° C./2.16 Kg), in the form of spheres were mixed with various concentrations of peroxide agent (0.3 and 0.7% w/w) and itaconic acid (1, 2, and 3% w/w). Grafting itaconic acid onto the polymer was done in a double screw extruder in a single stage and added directly into the feed zone. Processing was carried out using standard polyolefin processing conditions with a temperature range of 150° C. to 240° C. After modification of the polymer with the organic acid, it was neutralized with neutralizing agent NaOH in a second step, in a ratio of 1:2 (acid:base), to form the carboxylate salt nucleating agent grafted polymer. In a second variation, the procedure replicated using a solution process, where an itaconic acid-modified resin is dissolved in xylene and NaOH was added to the solution, under reflux for 1 h and 30 min, which also produced a modified polyethylene having improved optical properties as can be seen in Table 4. The opacity was measured based on ASTM D1003, with the difference that it was measured on films with the same thickness for comparison, not in plates.

TABLE 4

Opacity results on HDPE films (solution process)

| Samples | Opacity (%) | Film thickness (μm) |
| --- | --- | --- |
| HDPE-1 | 68 | 86 |
| HDPE-1-Na₂It (solution) | 24.2 | 86 |

Figure 8:
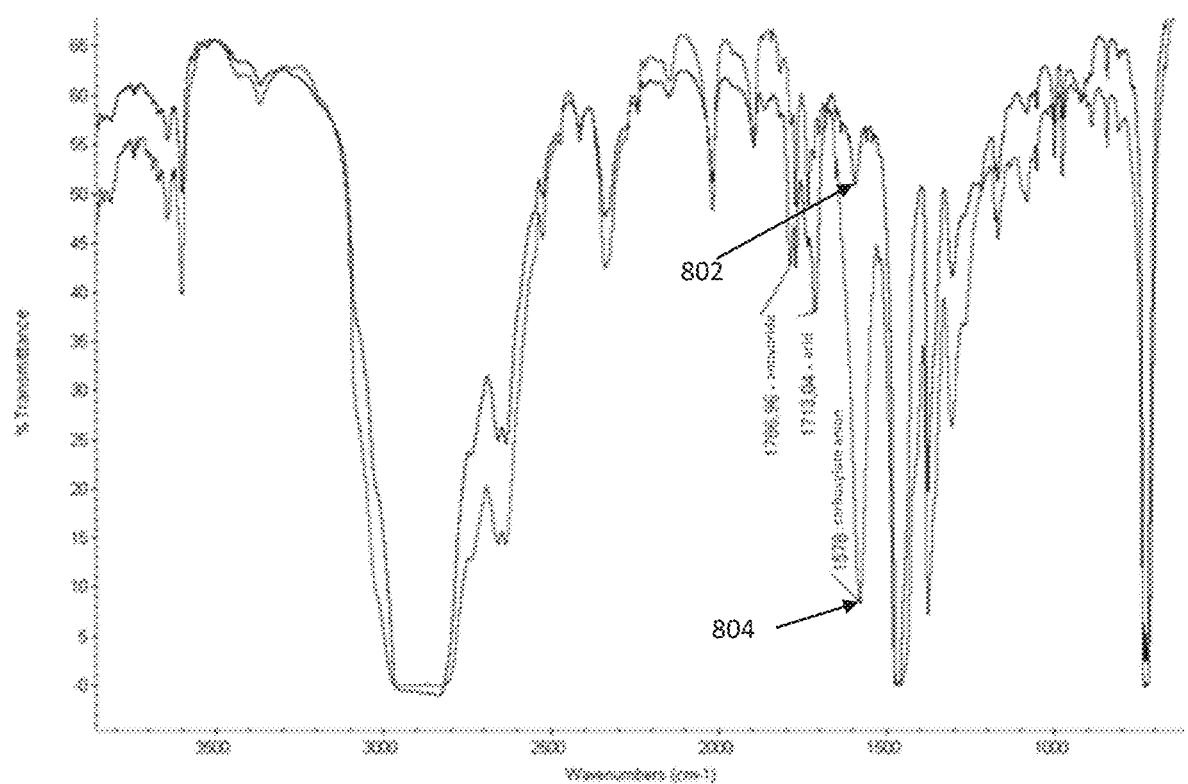
FIG. 8 is a graphic illustration showing Fourier transform infrared (FTIR) spectra for a number of embodiments in accordance with the present disclosure.

With particular respect to FIG. 8, an FTIR spectrum of grafted HDPE modified with itaconic acid (HDPE-It) and grafted HDPE modified with itaconic acid and neutralized with NaOH (HDPE-Na₂It) is shown. Of particular note is the emergence of the ionized carboxylate band at 1578 cm$^{-1}$ at 804 for the neutralized polymer HDPE-Na₂It, as compared to the acid form present in the grafted HDPE-It at 802.

Samples were analyzed on pressed film. For the FTIR analysis, a Nicolet model 470 infrared spectrometer with nominal resolution of 4 cm$^{-1}$ was used. The obtained spectra are an average of 32 sweeps in the wave number range between 4800 and 400 cm-1 under constant nitrogen flow. The samples were pressed between sheets of polyester film at a temperature of 170° C. under pressure of 5 to 7 tons for 30 seconds. The average thickness of the obtained film varied between 50 and 300 μm.

Assigned spectral bands were obtained by reference to the known literature values. The presence of acid in the sample is mainly characterized by the bands of carbonyls of acid and anhydride (generated by acid dehydration) located at approximately 1715 cm$^{-1}$ and 1780 cm$^{-1}$. The band area at 4323 cm$^{-1}$ (4482 to 3950 cm$^{-1}$), corresponding to the axial and angular vibration combinations of the methylene segments of the polymer chain (thickness band), was used to normalize the absorption values with respect to the thickness of the films.

For the preparation of the calibration curve, standards with known concentration of itaconic acid, prepared by solution process, were used. A specific calibration curve was performed for each type of polymer matrix, HDPE and PP, thus eliminating possible interferences from the matrix in the calibration curve.

As demonstrated in FIG. 8, FTIR analysis shows the formation of the nucleating agent chemically bound to the polymer chain, as indicated by itaconic acid bands 1787 and 1713 cm$^{-1}$ and subsequent formation of sodium itaconate through the NaOH neutralization procedure at the 1578 cm$^{-1}$ band.

Figure 9:
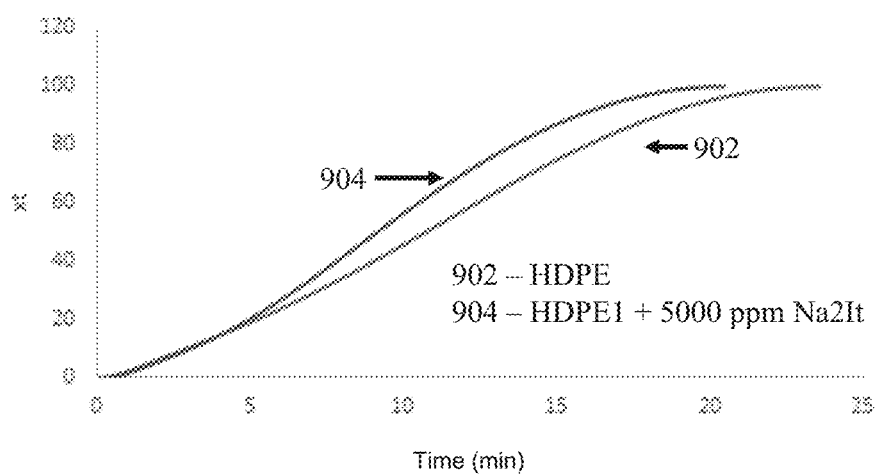
FIG. 9 is a graphical representation showing the kinetics of isothermal crystallization for a number of embodiments in accordance with the present disclosure.

With particular respect to FIG. 9, the kinetics of isothermal crystallization (124° C.) of pure HDPE (902) were compared to HDPE-Na$_2$It (904), as determined according to ISO 11357-7 2002. Here, the polymer grafted with the nucleating agent (904) exhibits increased crystallization rate compared to the pure polymer.

Example 3—Grafted Carboxylate Salt Nucleating Agent

In the next example, a heterophasic polypropylene copolymer (PP-ER (ethylene rubber) pure), MFI of 15 g/10 min (230° C./2.16 Kg), in the form of spheres was pre-mixed with peroxide (0.3 and 0.7 wt %) and itaconic acid (1, 2 and 3 wt %). Grafting of the organic acid of the carboxylate salt nucleating agent into the polymer (PP-ER-It) was done in a single-stage in double-screw extruder and through addition to the feed zone. Processing was performed using standard polyolefin processing under melt conditions with a temperature range of 150° C. to 240° C. After the modification of the polymer with the organic acid, it was neutralized with NaOH in a second step, in the proportion of 1:2 (acid:base), to form the polymer chemically modified with the itaconic acid salt (PP-ER-Na$_2$It).

Samples of commercial heterophasic polypropylene copolymer and NaOH-neutralized heterophasic propylene copolymer (PP-ER-Na$_2$It) were characterized by FTIR mode transmission, C13 NMR, AFM, DSC, optical Microscopy, and optical properties. The modified sample presented differentiated optical properties as shown in Table 5, which exhibits a decrease in opacity compared to the pure heterophasic copolymer, which is very high (at least 50% in relation to the non-nucleated heterophasic copolymer). Opacity for the samples was obtained according to ASTM D1003.

TABLE 5

Opacity results

| Sample | Opacity (%) |
|---|---|
| Commercial PP-ER | 88.1 ± 2.2 |
| PP-ER-Na2It | 41.5 ± 1.6 |

This decrease in opacity is due to the clarifying effect of sodium itaconate, bound to the polymer chain and which could be evidenced by increased crystallization temperature measured by DSC analysis according to ASTM D3418-03 as shown in Table 6.

TABLE 6

Thermal properties of samples

| Samples | Commercial PP-ER | PP-ER-It | PP-ER-Na2It |
|---|---|---|---|
| Tm2 (° C.) | 163 | 160 | 166 |
| Tc (° C.) | 115 | 116 | 119 |
| Enthalpy (J/g) | 105 | 102 | 64 |

DSC analysis also showed a decrease in melting enthalpy in the PP-ER-Na2It sample and increase in the melting temperature (Tm2). The enthalpy decrease effect may be due to incorporation of sodium itaconate heterogeneously in the chain, causing change in the crystallizable sequence of the polymer which leads to decrease in the amount and size of the crystals. The decrease in the size of the crystals, as well as the rate of formation of the crystals, was also evidenced by the crystallization kinetics analysis by Optical Microscopy (FIGS. 10.1-10.6) in an isotherm of 142° C. With particular respect to FIGS. 10.1-10.6, the comparative kinetics of isothermal crystallization are shown for of the commercial copolymer PP-ER (FIG. 10.1) and the grafted polymer PP-ER-Na$_2$It (FIG. 10.2) at 4 minutes, the commercial copolymer PP-ER (FIG. 10.3) and the grafted polymer PP-ER-Na$_2$It (FIG. 10.4) at 6 minutes, and the commercial copolymer PP-ER (FIG. 10.5) and the grafted polymer PP-ER-Na$_2$It (FIG. 10.6) at 8 minutes.

Figure 11:
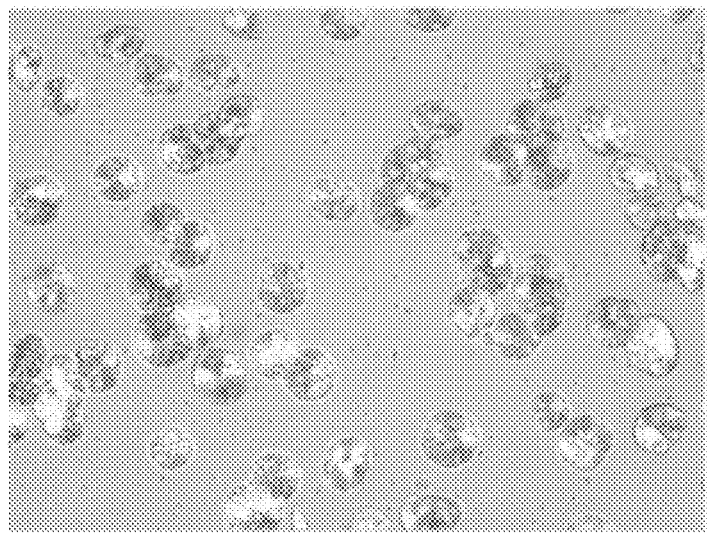
FIG. 11 is an image showing the crystallization kinetics of an embodiment in accordance with the present disclosure.

With particular respect to FIG. 11, an image illustrates the characteristic morphology of a commercial heterophasic copolymer PP-ER after 20 minutes of crystallization in isotherm at 142° C., where perfect and unguided spherulites were observed. Through the analysis of the image it is possible to observe that the crystallization occurs in an oriented way, forming crystals oriented in lines parallel to each other, as indicated in the image. It is also possible to observe that the crystals have an elliptical shape, differing significantly from the commercial heterophasic copolymer that has a spherical shape.

Based on the above described results, it is evident that the observed characteristics are inherent to sodium itaconate chemically bound to the polymer chain, no similar behavior being observed in a commercial heterophasic copolymer. In addition to the higher crystallization temperature, this new system presents lower opacity than expected for a heterophasic copolymer, as observed in Table 5.

In order to evaluate the morphology of the rubber phase and verify the interference of the solubilization and precipitation process (made to neutralize the chemically modified polymer) in the same, the samples listed below were analyzed by atomic force microscopy. With particular respect to FIGS. 12.1-12.6, atomic force microscopy (AFM) images of height and phase are shown for each of the samples. Specifically, 12.1 and 12.2 are the height and phase for a commercial sample of PP-ER used as a base copolymer morphology reference; FIGS. 12.3 and 12.4 show a sample of PP-ER combined with an organic acid in accordance with the present disclosure obtained after the process of chemical modification, solubilization and precipitation; and FIGS. 12.5 and 12.6 show a sample of PP-ER chemically modified with the carboxylate salt, obtained after chemical modification and neutralization.

AFM analysis shows the solubilization and precipitation process of PP-ER-It modifies the morphology of the rubber domains making them unformed, but still aggregated. The films and specimens obtained with PP-ER-It show no improvement in optical properties compared to the commercial heterophasic copolymer. On the other hand, the morphology obtained with the nucleating agent chemically bound to the polymer chain (PP-ER-Na$_2$It) shows domains homogeneously dispersed in the matrix and with much smaller sizes and with regular shape.

The gain of optical properties of the PP-ER-Na2It material is justified by the alteration of the state of aggregation of the rubber and also by the morphology of the crystals and their alignment during crystallization. This phenomenon can also be observed in the pressed specimens used for AFM analysis. With particular respect to FIGS. 13.1 and 13.2, spherical crystals characteristic of heterophasic copolymer of PP (sample PP-ER-It) are observed, whereas in the sample PP-ER-Na2It crystals are perfectly aligned in parallel. It is important to point out that this image was obtained with the magnifying glass of the equipment, not being a result of AFM analysis.

Figure 14:
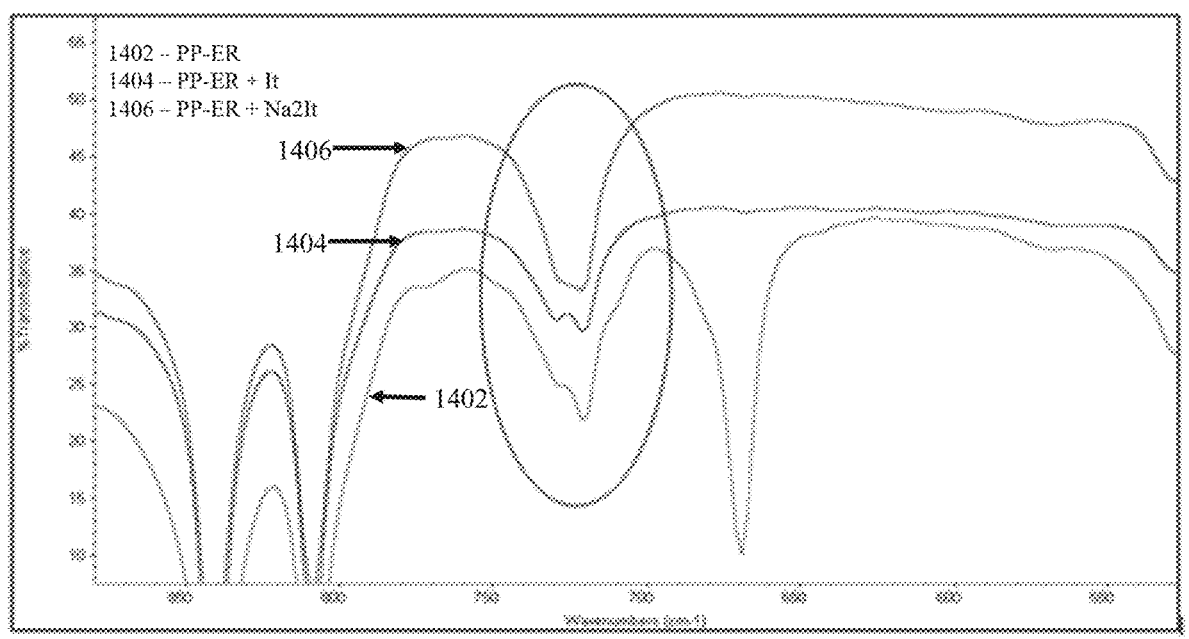
FIG. 14 is a FTIR spectra showing a number of embodiments in accordance with the present disclosure.

FTIR and 13C-NMR were used to show that the morphological changes observed by microscopy in the heterophasic copolymer chemically modified with sodium itaconate are not due to loss of the rubber phase of the heterophasic copolymer during the neutralization process. These changes are due to the presence of the carboxylate salt nucleating agent grafted onto the copolymer chain. With particular respect to FIG. 14, an FTIR spectra of the commercial heterophasic PP (1402), itaconic acid-modified heterophasic PP (1404) and itaconic acid modified PP and neutralized with NaOH (1406). The spectra of the samples did not show significant differences regarding the characteristic region of ethene (720 and 730 cm$^{-1}$), showing that there was no loss of the rubber phase.

Figure 15:
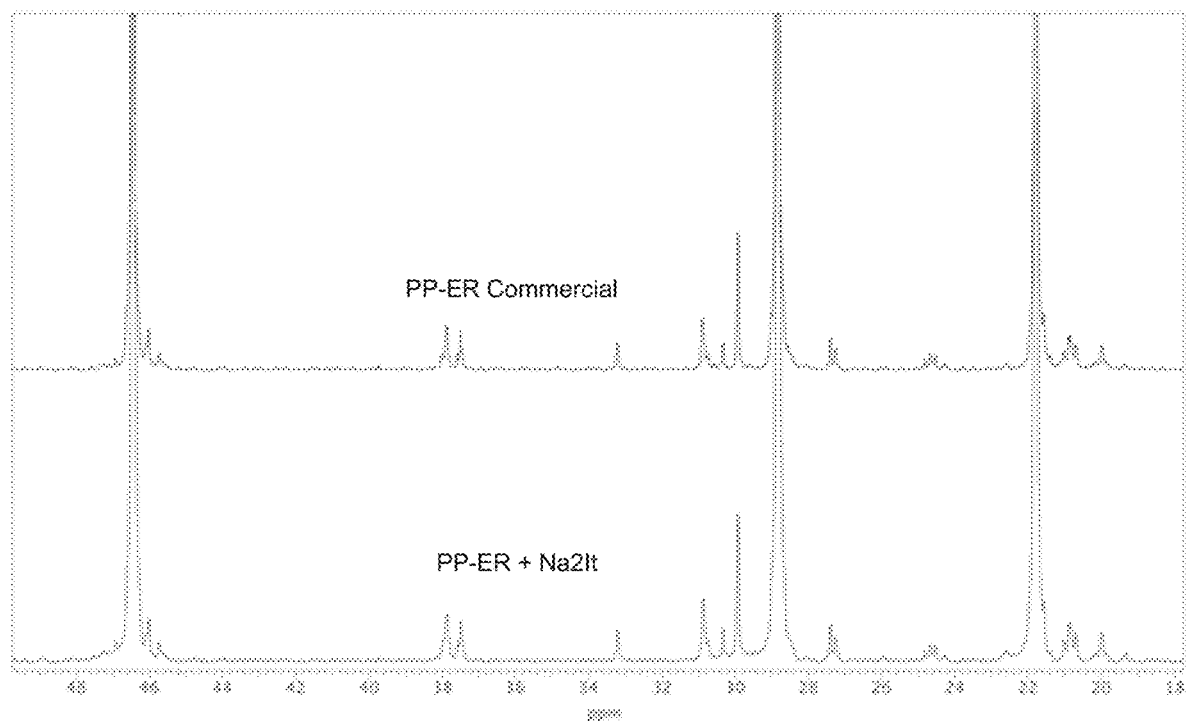
FIG. 15 is a spectra obtained from 13C nuclear magnetic resonance (NMR) for a number of embodiments in accordance with the present disclosure.

A similar phenomenon may be observed in FIG. 15 and Table 7, in which 13C NMR was used to analyze PP-ER-Na$_2$It alongside a comparative commercial formulation of PP-ER. With particular respect to FIG. 15, 13C NMR spectra of commercial PP-ER and PP-ER-Na2It samples are overlaid in the region of 48 to 18 ppm. The triad analysis of the spectra in this region shows that there are no differences in composition between the samples, indicating that there was no loss of rubber fraction during the modification process. Results are shown below in Table 7.

TABLE 7

NMR 13C Results

| Triad | mol % | mol % |
|---|---|---|
| PPP | 87.7 | 88.1 |
| PPE | 3.9 | 3.8 |
| EPE | 1.3 | 1.2 |
| EEE | 2.9 | 3.1 |
| PEE | 2.4 | 2.2 |
| PEP | 1.8 | 1.6 |

Example 4—Dispersed Carboxylate Salt Nucleating Agent

Heterophasic polypropylene copolymer (PP-ER2), density of 0.895 g/cm$^3$ (ASTM D792A), MFI 0.80 g/10 min (230° C./2.16 Kg) (ASTM D1238), generally used in packaging and technical parts in general, was mixed with Na$_2$It salt in an extrusion process. The extrusion conditions are similar to those usually used for polyolefins.

The sample was then injected according to ASTM D 3641 using a 1 mm thick plate for optical properties tests to produce a product having 60° brightness and opacity according to ASTM D2457 and D1003, respectively. The sample was also measured by DSC analysis according to ASTM D3418-03. The results obtained show very high performance when Na2It salt is added to the heterophasic polypropylene copolymer, with improved opacity properties, reaching a 50% increase in transparency of the material with dispersed nucleating agent compared to commercial resin. The results of optical and thermal properties are presented in Table 8.

TABLE 8

Results from DSC and optical properties for heterophasic polypropylene copolymer

| Sample | Tc (° C.) | Tm$_2$ (° C.) | Opacity (%) | Brightness (°) |
|---|---|---|---|---|
| PP-ER2 commercial | 116.5 | 165.0 | 89.8 | 33.6 |
| PP-ER2-Na$_2$It | 122.5 | 162.0 | 46.6 | 29.0 |

The decrease in opacity is due to the clarifying effect of sodium itaconate, which dispersed homogeneously in the polyolefin matrix, gave a nucleation effect, that are perceived in the opacity and thermal properties results (evidenced by the increase of crystallization temperature).

Although only a few examples have been described in detail above, those skilled in the art will readily appreciate that many modifications are possible in the examples without materially departing from this subject disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112 (f) for any limitations of any of the claims herein, except for those in which the claim expressly uses the words 'means for' together with an associated function.

What is claimed is:
1. A method comprising:
    modifying the crystallization properties of a polymer composition comprising a polyolefin and a nucleating agent with the structure:

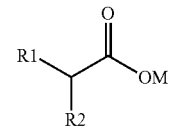

wherein R1 is alkenyl and R2 is, selected from hydrogen, alky, or aryl, wherein the alkyl, alkenyl, or aryl may be substituted with one or more carboxylate groups and M is a metal selected from Group I of the Periodic Table, with the provision that the nucleating agent is dispersed in the polyolefin.

2. The method of claim 1, wherein the nucleating agent is one or more selected from a group consisting of itaconate salts, acrylate salts, maleic salts, sorbic salts, fumaric salts, and unsaturated carboxylic salts.

3. The method of claim 1, wherein the nucleating agent is one or more selected from a group consisting of sodium itaconate, potassium itaconate, and lithium itaconate.

4. The method of claim 1, wherein the nucleating agent is present at a concentration ranging from 500 ppm to 7,000 ppm.

5. The method of claim 1, wherein the polyolefin is polyethylene or polypropylene.

6. The method of claim 1 wherein modifying the crystallization properties of a polymer composition comprises processing the polymer composition under melt conditions.

7. The method of claim 6, wherein processing the polymer composition under melt conditions comprises using an extruder.

8. A composition comprising:
   a polyolefin; and
   a nucleating agent dispersed in the polyolefin, wherein the nucleating agent has the structure:

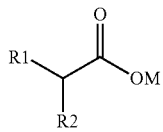

wherein R1 is alkenyl and R2 is selected from hydrogen, alkyl, or aryl, wherein the alkyl, alkenyl, or aryl is substituted with one or more carboxylate groups and M is a metal selected from Group I of the Periodic Table.

9. The composition of claim 8, wherein the nucleating agent is one or more selected from a group consisting of itaconate salts, acrylate salts, maleic salts, sorbic salts, fumaric salts, and unsaturated carboxylic salts.

10. The composition of claim 8, the composition further comprising:
    at least one pigment;
    wherein the nucleating agent and the pigment are present at a ratio in the range of 20,000:1 to 500:1 of nucleating agent:pigment.

11. The composition of claim 8, wherein the nucleating agent is dispersed in the polyolefin at a concentration ranging from 500 ppm to 7,000 ppm.

12. An article formed using the modified polymer composition of claim 8.

13. The article of claim 12, wherein the article is a monolayer film, multilayer film, packaging, cap, injection molded article, extruded article, co-extruded article, thermoformed article, foam, blow-molded article, rotomolded article, or pultruded article.

* * * * *